US012547257B1

(12) United States Patent
Chou et al.

(10) Patent No.: US 12,547,257 B1
(45) Date of Patent: Feb. 10, 2026

(54) KNOB STRUCTURE

(71) Applicants: ICHIA TECHNOLOGY (SUZHOU) CO., LTD., Jiangsu (CN); ICHIA TECHNOLOGIES, INC., Taoyuan (TW)

(72) Inventors: Chung-Ching Chou, Taoyuan (TW); Chung-Yu Chen, Taoyuan (TW)

(73) Assignees: ICHIA TECHNOLOGY (SUZHOU) CO., LTD., Jiangsu (CN); ICHIA TECHNOLOGIES, INC., Taoyuan (TW)

( * ) Notice: Subject to any disclaimer, the term of this patent is extended or adjusted under 35 U.S.C. 154(b) by 0 days.

(21) Appl. No.: 19/014,349

(22) Filed: Jan. 9, 2025

(30) Foreign Application Priority Data

Nov. 25, 2024 (CN) .......................... 202411692531.1

(51) Int. Cl.
*G06F 3/0362* (2013.01)
*G06F 3/02* (2006.01)
*G06F 3/039* (2013.01)

(52) U.S. Cl.
CPC .............. *G06F 3/0362* (2013.01); *G06F 3/02* (2013.01); *G06F 3/0393* (2019.05)

(58) Field of Classification Search
CPC ......... G06F 3/0362; G06F 3/0393; G06F 3/02
See application file for complete search history.

(56) References Cited

U.S. PATENT DOCUMENTS

| 5,841,428 A * | 11/1998 | Jaeger ................. G02F 1/13306 |
| | | 345/184 |
| 8,207,872 B2 * | 6/2012 | Huang ................. H01H 13/702 |
| | | 341/32 |
| 10,921,913 B1 * | 2/2021 | Fong ...................... H01H 19/08 |
| 11,181,993 B2 * | 11/2021 | Nishimoto ............. G06F 3/038 |
| 12,036,864 B2 * | 7/2024 | Carditello ............. B60K 35/212 |
| 12,164,707 B2 * | 12/2024 | Selvi ...................... G06F 3/0393 |
| 2014/0042004 A1 * | 2/2014 | Tseng .................... G06F 3/0362 |
| | | 200/336 |
| 2017/0052617 A1 * | 2/2017 | Okuzumi .............. G06F 3/0362 |
| 2017/0316901 A1 * | 11/2017 | Sawada ................. H01H 19/02 |
| 2019/0391672 A1 * | 12/2019 | Fischer .................... G05G 5/06 |
| 2021/0008836 A1 | 1/2021 | Caldeira et al. |
| 2021/0055806 A1 * | 2/2021 | Shepelev ............... B60K 35/10 |

(Continued)

FOREIGN PATENT DOCUMENTS

CN 114981909 A 8/2022

*Primary Examiner* — Ariel A Balaoing
(74) *Attorney, Agent, or Firm* — Li & Cai Intellectual Property (USA) Office (57) ABSTRACT

A knob structure can be installed on a touch control function display and includes a seat, a substrate, a trigger element, and an operating cover. The substrate is disposed on the seat, and includes a carrier, a ring pad, and a plurality of inner pads and outside pads. The carrier has first, second, and third ring configuration regions that jointly define a center. The inner pads are disposed on the second ring configuration region. The inner pads are spaced apart and electrically coupled. The outside pads are disposed on the third ring configuration region. The outside pads are spaced apart and electrically coupled. The trigger element can be operated to electrically couple the ring pad, and at least one of the inner pads and the outside pads, and sends a first signal, a second signal, or a third signal to the touch control display panel.

15 Claims, 11 Drawing Sheets (56) References Cited

U.S. PATENT DOCUMENTS

2022/0244810 A1* 8/2022 Fong ..................... G06F 3/0442
2024/0069655 A1* 2/2024 Fong ..................... G06F 3/0446
2024/0329762 A1* 10/2024 Beauregard ........... G06F 3/0362
2025/0216960 A1* 7/2025 Masumura .............. G06F 3/016
2025/0271461 A1* 8/2025 Hirakawa ............... G01P 13/04

* cited by examiner

KNOB STRUCTURE

CROSS-REFERENCE TO RELATED PATENT APPLICATION

This application claims the benefit of priority to China Patent Application No. 202411692531.1, filed on Nov. 25, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a knob structure, and more particularly to a knob structure installed on a touch control display panel.

BACKGROUND OF THE DISCLOSURE

A conventional knob structure generates different signals through changes in electrical relationships, so as to recognize a current state of the conventional knob structure based on the variations between different signals. However, the components and methods used in the conventional knob structure to achieve changes in electrical relationships are overly complex, which can result in a higher manufacturing cost for the conventional knob structure.

SUMMARY OF THE DISCLOSURE

In response to the above-referenced technical inadequacy, the present disclosure provides a knob structure.

In order to solve the above-mentioned problems, one of the technical aspects adopted by the present disclosure is to provide a knob structure. The knob structure can be installed on a touch control display panel, and the knob structure includes a seat, a substrate, a trigger element, and an operating cover. The substrate is disposed on the seat, and the substrate includes a carrier, a ring pad, a plurality of inner pads, and a plurality of outside pads. The carrier has a first ring configuration region, a second ring configuration region, and a third ring configuration region that jointly define a center. The ring pad is disposed on the first ring configuration region. The inner pads are disposed on the second ring configuration region. The inner pads are spaced apart from each other and are electrically coupled to each other. The outside pads are disposed on the third ring configuration region. The outside pads are spaced apart from each other and are electrically coupled to each other. An imaginary line between any one of the outside pads and the center defines a first side and a second side. One of the inner pads is arranged on the first side, and the second side is configured to not have any one of the outside pads and the inner pads. The trigger element is disposed on the substrate. The trigger element can be operated to electrically couple the ring pad, and at least one of the inner pads and the outside pads. When the ring pad and any one of the outside pads are electrically coupled by the trigger element, the substrate sends a first signal to the touch control display panel. When the ring pad and any one of the inner pads are electrically coupled by the trigger element, the substrate sends a second signal to the touch control display panel. When the ring pad is individually and electrically coupled by the trigger element, the substrate sends a third signal to the touch control display panel. The operating cover is disposed on the seat. The trigger element and the substrate are covered by the operating cover.

In one of the possible or preferred embodiments, the first ring configuration region is surrounded by the second ring configuration region, and the second ring configuration region is located between the first ring configuration region and the third ring configuration region.

In one of the possible or preferred embodiments, an outer arc length of each of the inner pads is within a range from 95% to 105% of an outer arc length of each of the outside pads.

In one of the possible or preferred embodiments, an outer arc length of each of the inner pads and an outer arc length of each of the outside pads are within a range from 3% to 5% of the circumference of the carrier.

In one of the possible or preferred embodiments, in one of the inner pads and one of the outside pads adjacent to each other, a sum of a width of the inner pad along a radial direction and a width of the outside pad along the radial direction is less than or equal to a shortest distance from any one of the inner pads to the ring pad.

In one of the possible or preferred embodiments, the trigger element includes a plurality of conductive spring pieces disposed on the carrier. Two contact ends of each of the conductive spring pieces correspond in position to the first ring configuration region, the second ring configuration region, and the third ring configuration region, and each of the conductive spring pieces can be electrically coupled to the ring pad, the inner pads, and the outside pads.

In one of the possible or preferred embodiments, the seat has a first opening, a second opening, and a third opening corresponding in position to the second ring configuration region and the third ring configuration region, and a fourth opening that corresponds in position to the first ring configuration region. The ring pad is exposed to an outside of the seat through the fourth opening, and a part of the outside pads and a part of the inner pads are exposed to an outside of the seat through the first opening, the second opening, and the third opening. Exposure conditions of the outside pads and the inner pads through the first opening, the second opening, and the third opening are distinct from each other. The conductive spring pieces pass through the first opening, the second opening, the third opening, and the fourth opening to electrically couple the ring pad, the inner pads, and the outside pads.

In one of the possible or preferred embodiments, the knob structure includes a plurality of push switches. When each of the push switches is pressed, each of the push switches can electrically couple the inner pads and the ring pad.

In order to solve the above-mentioned problems, another one of the technical aspects adopted by the present disclosure is to provide a knob structure. The knob structure can be installed on a touch control display panel, and the knob structure includes a seat, a substrate, a trigger element, and an operating cover. The substrate is disposed on the seat, and the substrate includes a carrier, a ring pad, a plurality of inner assemblies, and a plurality of outside pads. The carrier has a first ring configuration region, a second ring configuration region, and a third ring configuration region that jointly define a center. The ring pad is disposed on the first ring configuration region. The inner assemblies are disposed on the second ring configuration region. Each of the inner assemblies includes a plurality of inner pads, and the inner pads are spaced apart from each other and are electrically coupled to each other. The outside pads are disposed on the third ring configuration region. The outside pads are spaced apart from each other and are electrically coupled to each other. An imaginary line is between any one of the outside pads and each of the inner assemblies is passed through by two imaginary lines. The trigger element is disposed on the substrate. The trigger element can be operated to electrically couple the ring pad, and at least one of the inner pads and the outside pads. When the ring pad and any one of the outside pads are electrically coupled by the trigger element, the substrate sends a first signal to the touch control display panel. When the ring pad and any one of the inner pads are electrically coupled by the trigger element, the substrate can send a second signal or a third signal to the touch control display panel according to a position of one of the outside pads corresponding to the first signal. The operating cover is disposed on the seat. The trigger element and the substrate are covered by the operating cover.

In one of the possible or preferred embodiments, the first ring configuration region is surrounded by the second ring configuration region, and the second ring configuration region is located between the first ring configuration region and the third ring configuration region.

In one of the possible or preferred embodiments, a quantity of the inner pads in each of the inner assemblies is three, the three inner pads are spaced apart from each other, and an outer arc length of one of the three inner pads located in the middle is greater than each of outer arc lengths of another two of the three inner pads.

In one of the possible or preferred embodiments, in one of the inner pads and one of the outside pads adjacent to each other, a sum of a width of the inner pad along a radial direction and a width of the outside pad along the radial direction is less than or equal to a shortest distance from any one of the inner pads to the ring pad.

In one of the possible or preferred embodiments, the trigger element includes a plurality of conductive spring pieces disposed on the carrier. Two contact ends of each of the conductive spring pieces correspond in position to the first ring configuration region, the second ring configuration region, and the third ring configuration region, and each of the conductive spring pieces can be electrically coupled to the ring pad, the inner pads, and the outside pads.

In one of the possible or preferred embodiments, the seat has a first opening, a second opening, and a third opening corresponding in position to the second ring configuration region and the third ring configuration region, and a fourth opening that corresponds in position to the first ring configuration region. The ring pad is exposed to an outside of the seat through the fourth opening, and a part of the outside pads and a part of the inner pads are exposed to an outside of the seat through the first opening, the second opening, and the third opening. Exposure conditions of the outside pads and the inner pads through the first opening, the second opening, and the third opening are distinct from each other. The conductive spring pieces pass through the first opening, the second opening, the third opening, and the fourth opening to electrically couple the ring pad, the inner pads, and the outside pads.

In one of the possible or preferred embodiments, the knob structure includes a plurality of push switches. When each of the push switches is pressed, each of the push switches can electrically couple the ring pad and the inner pads of any one of the inner assemblies.

Therefore, in the knob structure provided by the present disclosure, by virtue of "the carrier having a first ring configuration region, a second ring configuration region, and a third ring configuration region that jointly define a center," "the inner pads being spaced apart from each other and being electrically coupled to each other, and the outside pads being spaced apart from each other and being electrically coupled to each other" and "the trigger element being configured to be operated to electrically couple the ring pad, and at least one of the inner pads and the outside pads," the knob structure can generate a first signal, a second signal, and a third signal to identify the current state of the knob structure (e.g., being pressed, rotated, or touched).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 6, a first embodiment of the present disclosure provides a knob structure 100. The knob structure 100 can be installed on a touch control display panel (not shown). In practice, the knob structure 100 can send a variety of different signals, and the signals can be identified and responded to by an application within the touch control display panel. However, details regarding the identification and response between the knob structure 100 and the touch control display panel are well-known to those skilled in the art and are not the focus of the present disclosure, and will be omitted hereinafter.

Referring to FIG. 1 to FIG. 4, the knob structure 100 includes a seat 1, a substrate 2 disposed on the seat 1, a trigger element 3 disposed on the substrate 2, and an operating cover 4 that is disposed on the seat 1 and covers the trigger element 3 and the substrate 2. The following description describes the structure and connection relation of each component of the knob structure 100.

Figure 1:
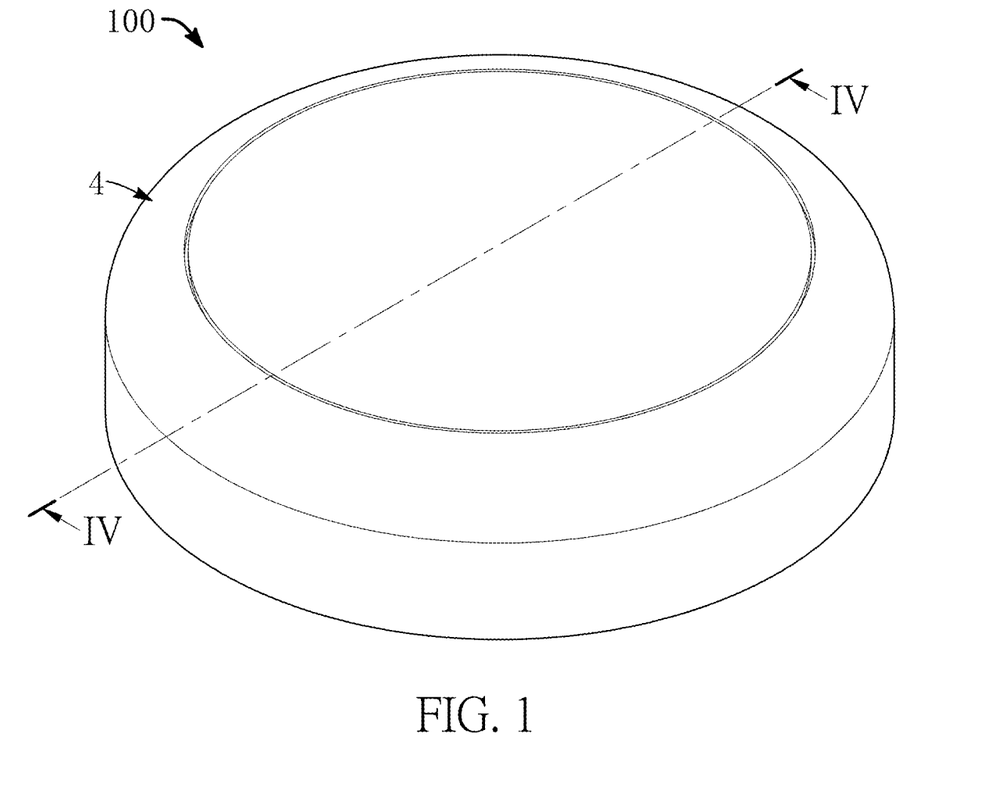
FIG. 1 is a schematic perspective view of a knob structure according to the present disclosure.
Figure 2:
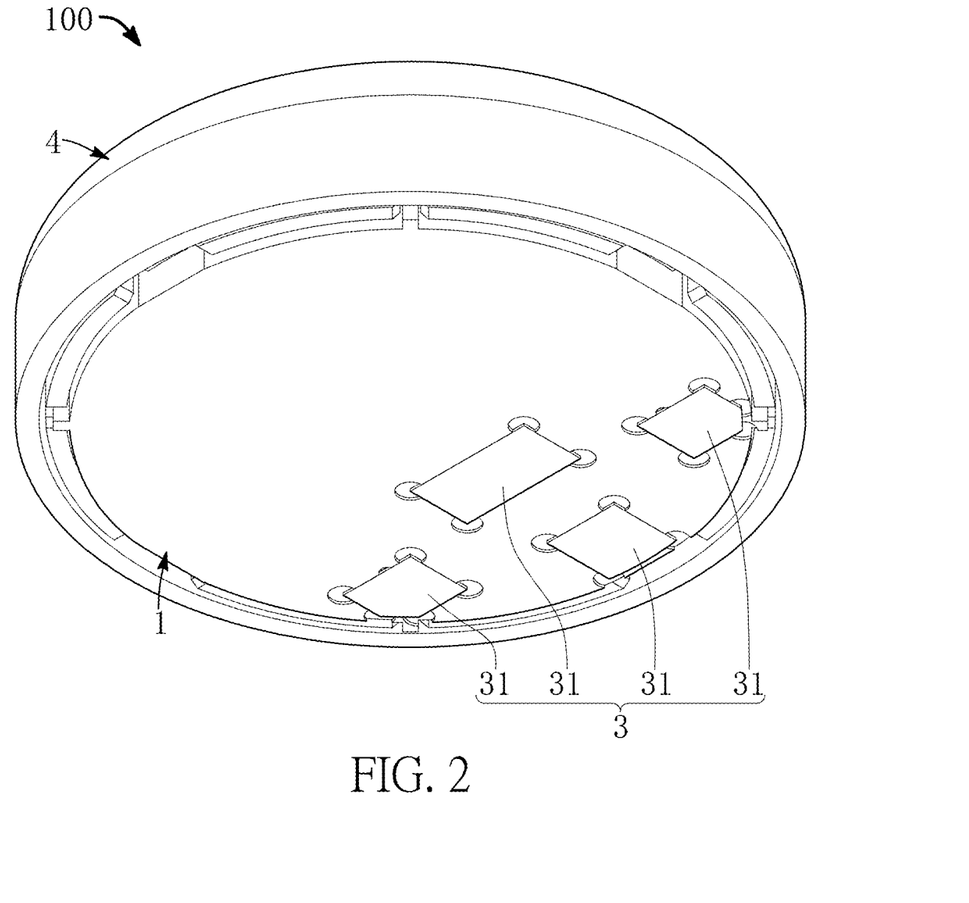
FIG. 2 is another schematic perspective view of the knob structure according to the present disclosure.
Figure 3:
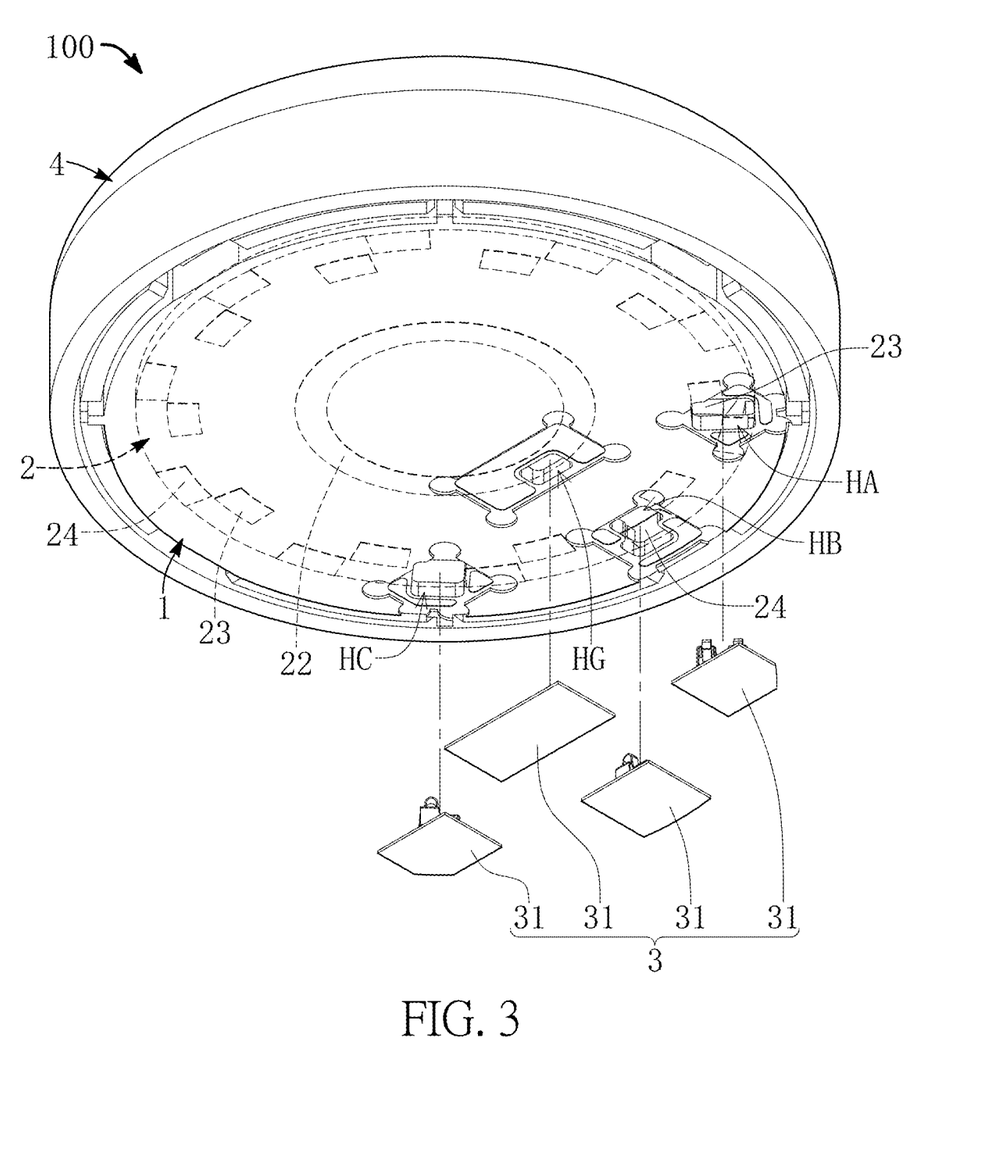
FIG. 3 is a schematic partial exploded view of the knob structure in FIG. 2.
Figure 4:
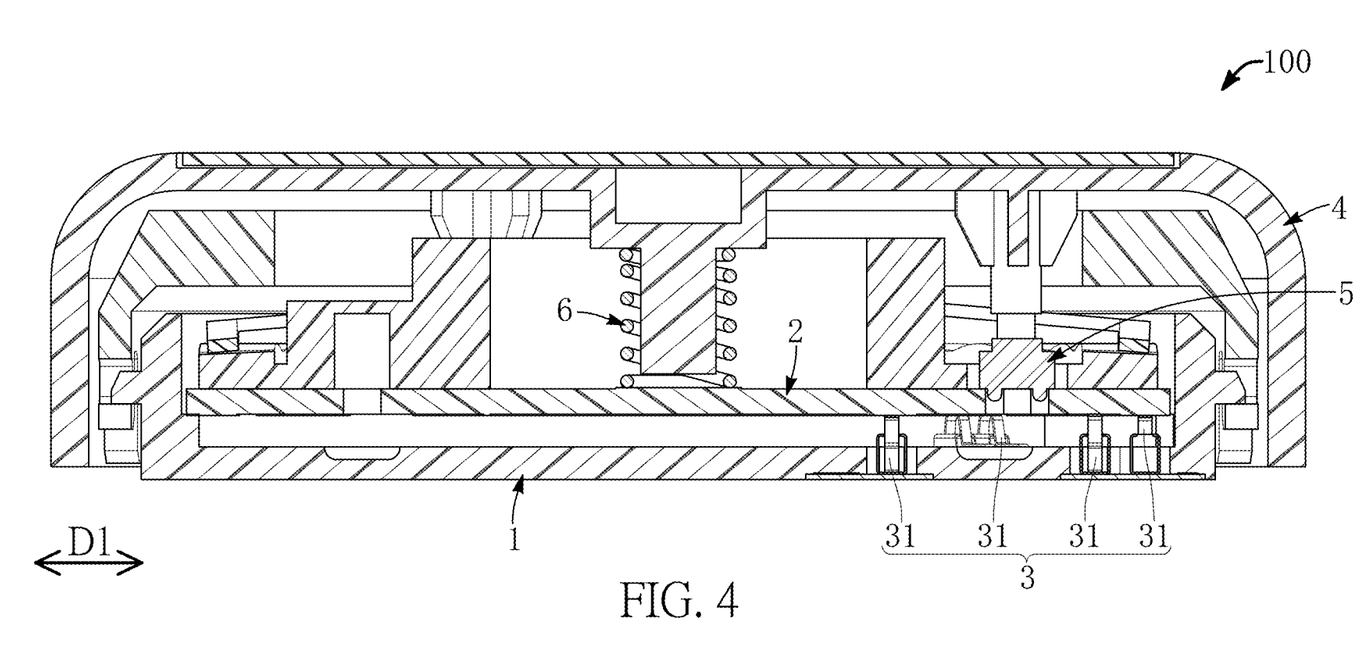
FIG. 4 is a schematic cross-sectional view taken along line IV-IV of FIG. 1.
Figure 5:
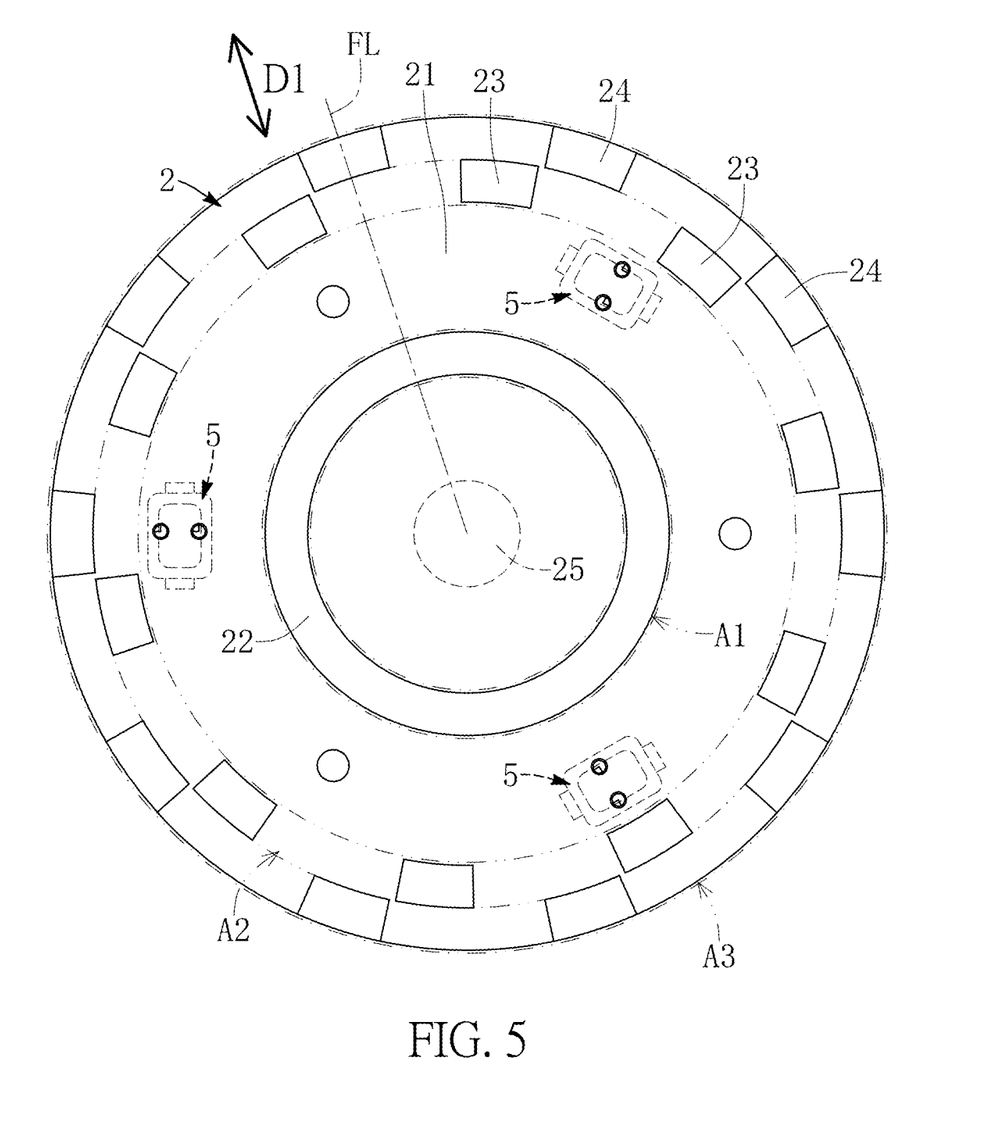
FIG. 5 is a schematic planar view of the substrate according to the present disclosure.

Referring to FIG. 4 and FIG. 5, the seat 1 in the present embodiment is made of an insulating material, and the seat has a first opening HA, a second opening HB, a third opening HC, and a fourth opening HG that are spaced apart from each other. The first opening HA, the second opening HB, and the third opening HC are arranged in an annular arrangement, and the fourth opening HG is located on an inside of the first opening HA, the second opening HB, and the third opening HC. In other words, the fourth opening HG is adjacent to the center of the seat 1.

The substrate 2 includes a carrier 21, a ring pad 22, a plurality of inner pads 23, and a plurality of outside pads 24. The carrier 21 in the present embodiment is a circular printed circuit board, so that a conductive trace is within the carrier 21. Moreover, the carrier 21 has a first ring configuration region A1, a second ring configuration region A2, and a third ring configuration region A3 that jointly define a center.

The first ring configuration region A1 corresponds in position to the fourth opening HG, so that a portion of the first ring configuration region A1 can be exposed to the outside of the seat 1 through the fourth opening HG. In addition, the positions of the second ring configuration region A2 and the third ring configuration region A3 correspond in position to the first opening HA, the second opening HB, and the third opening HC, so that portions of the second ring configuration region A2 and the third ring configuration region A3 can be exposed to the outside of the seat 1 through the first opening HA, the second opening HB, and the third opening HC.

In the present embodiment, the first ring configuration region A1 is surrounded by the second ring configuration region A2, and the second ring configuration region A2 is located between the first ring configuration region A1 and the third ring configuration region A3. In other words, the first ring configuration region A1, the second ring configuration region A2, and the third ring configuration region A3 are arranged sequentially outward from the center.

The ring pad 22 is arranged on the first ring configuration region A1 and is exposed on the carrier 21. The inner pads 23 are arranged on the second ring configuration region A2, and the inner pads 23 are spaced apart from each other and are electrically coupled to each other. The outside pads 24 are arranged on the third ring configuration region A3, and the outside pads 24 are spaced apart from each other and are electrically coupled to each other. In other words, the ring pad 22 can independently form a first circuit, the inner pads 23 can jointly form a second circuit, and the outside pads 24 can jointly form a third circuit. Therefore, the trigger element 3 can generate different signals through the electrical relationships created by at least one of the first circuit, the second circuit, and the third circuit.

Figure 6:
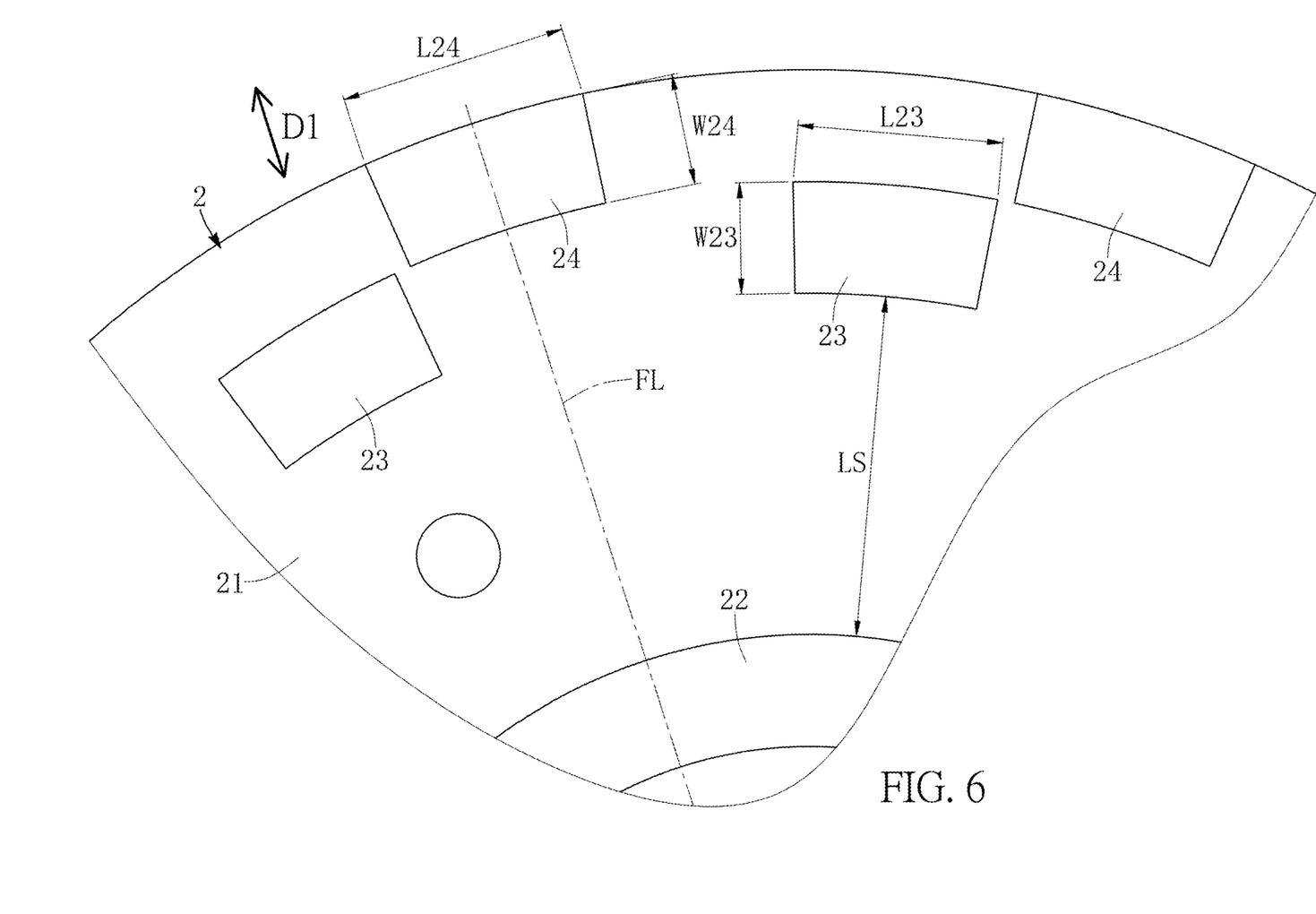
FIG. 6 is a schematic enlarged view of a section in FIG. 5.

As shown in FIG. 5 and FIG. 6, in practice, an outer arc length L23 of each of the inner pads 23 is within a range from 95% to 105% of an outer arc length L24 of each of the outside pads 24. In other words, each of the inner pads 23 and each of the outside pads 24 are generally of equal length.

In addition, a quantity of the inner pads 23 and a quantity of the outside pads 24 can each be ten. Therefore, the outer arc length L23 of each of the inner pads 23 and the outer arc length L24 of each of the outside pads 24 are within a range from 3% to 5% of a circumference of the carrier 21, so that the inner pads 23 and the outside pads 24 can be evenly distributed on the carrier 21.

It is worth noting that the present disclosure defines one of a plurality of groups that each have one of the inner pads 23 and one of the outside pads 24, the inner pad 23 and the outside pad 24 in each of the groups are interleaved in the radial direction D1, and two adjacent ones of the groups are spaced apart from each other. In other words, an imaginary line FL between any one of the outside pads 24 and the center defines a first side (e.g., the clockwise side) and a second side (e.g., the counterclockwise side), one of the inner pads 23 is arranged on the first side, and the second side is configured to not have any one of the outside pads 24 and the inner pads 23.

Referring to FIG. 4 and FIG. 5, the trigger element 3 can be operated to electrically couple the ring pad 22, and at least one of the inner pads 23 and the outside pads 24. When the ring pad 22 is electrically coupled to any one of the outside pads 24 by the trigger element 3, the substrate 2 can send a first signal to the touch control display panel. When the ring pad 22 is electrically coupled to any one of the inner pads 23 by the trigger element 3, the substrate 2 can send a second signal to the touch control display panel. When the ring pad 22 is independently and electrically coupled by the trigger element 3, the substrate 2 can send a third signal to the touch control display panel. In practice, the knob structure 100 can utilize the three different signals to determine the operational actions of rotation, pressing, or touching.

Additionally, for ease of understanding, the following chart summarizes the relationships of the first signal, the second signal, and the third signal with respect to the inner pad 23, the outside pads 24, and the ring pad 22 in Table 1 below.

TABLE 1

Rotation action of the knob structure

|  | outside pad | inner pad | ring pad |
| --- | --- | --- | --- |
| First signal | electrically coupled |  | electrically coupled |
| Second signal |  | electrically coupled | electrically coupled |
| Third signal |  |  | electrically coupled |

In practice, the trigger element 3 includes a plurality of conductive spring pieces 31, the conductive spring pieces 31 are arranged in a ring shape on the carrier 21 and are spaced apart from each other. The conductive spring pieces 31 correspond in position to the first opening HA, the second opening HB, the third opening HC, and the fourth opening HG, and the conductive spring pieces 31 can connect to the touch control display panel. Two contact ends (not shown) of each of the conductive spring pieces 31 correspond in position to the first ring configuration region A1, the second ring configuration region A2, and the third ring configuration region A3, and each of the conductive spring pieces 31 can be electrically coupled to the ring pad 22, the inner pad 23, and the outside pad 24. In practice, each of the conductive spring pieces 31 can be in a Y-shape, but the disclosure is not limited thereto.

Figure 9:
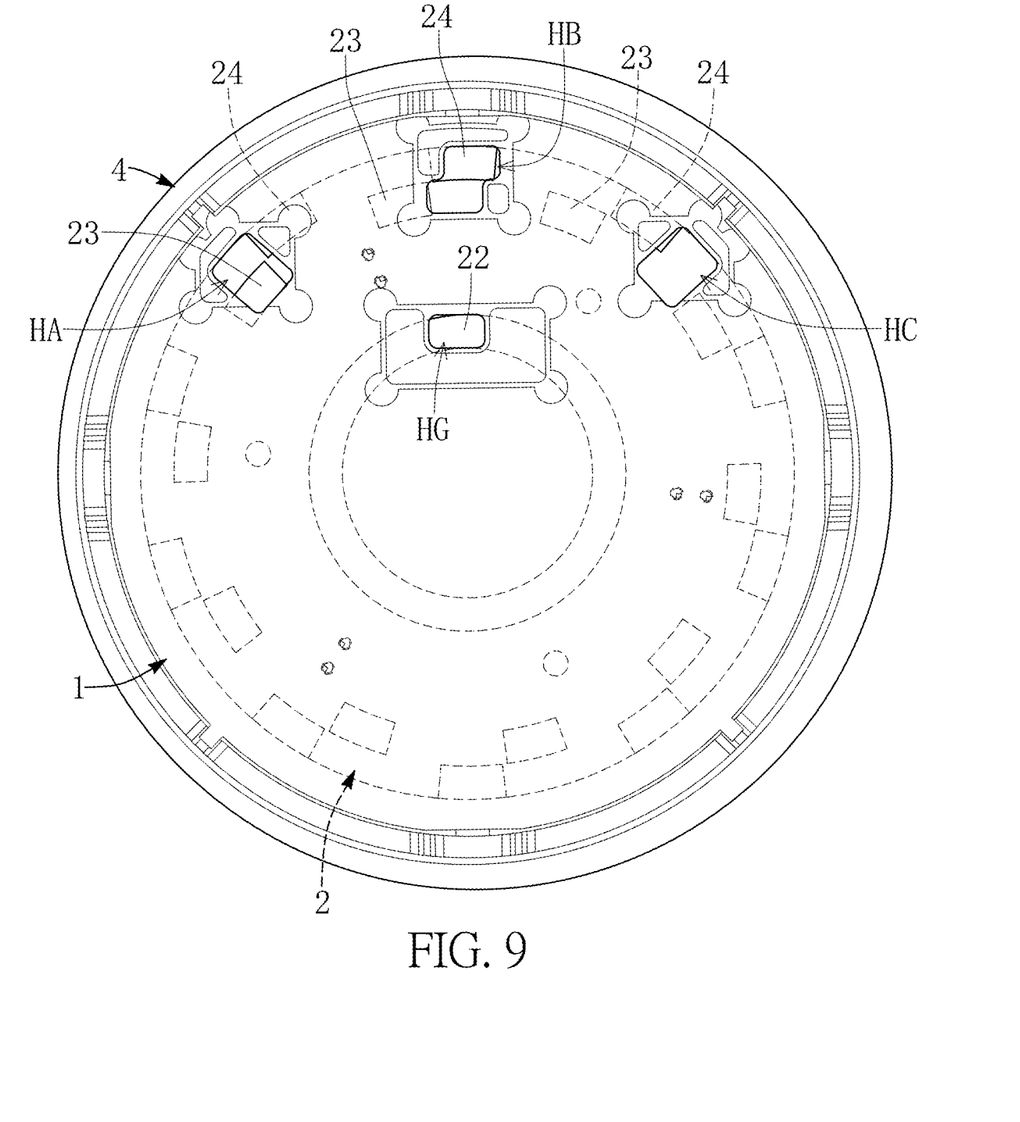
FIG. 9 is a schematic view of a seat rotating relative to the substrate according to the present disclosure.
Figure 10:
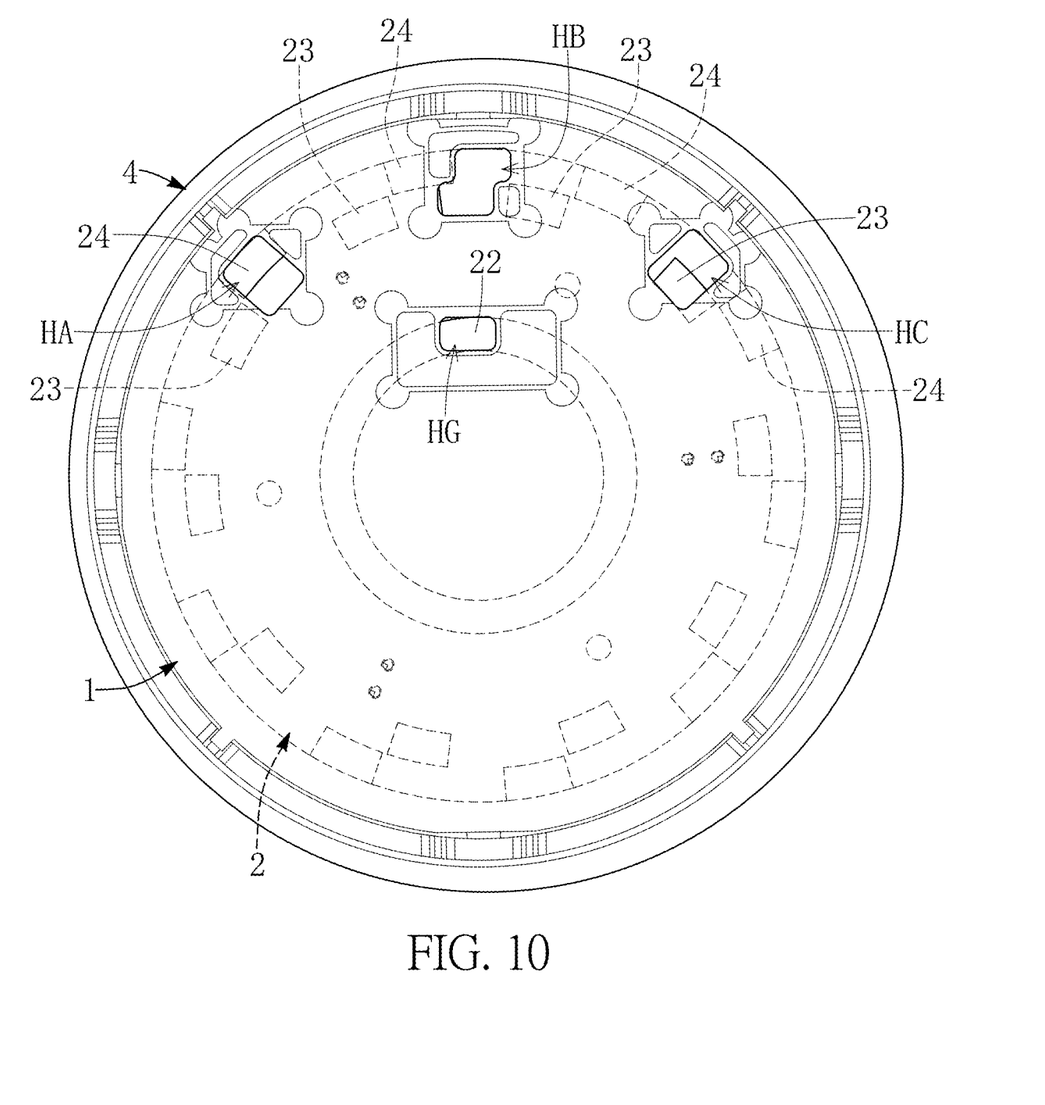
FIG. 10 is another schematic view of the seat rotating relative to the substrate according to the present disclosure.
Figure 11:
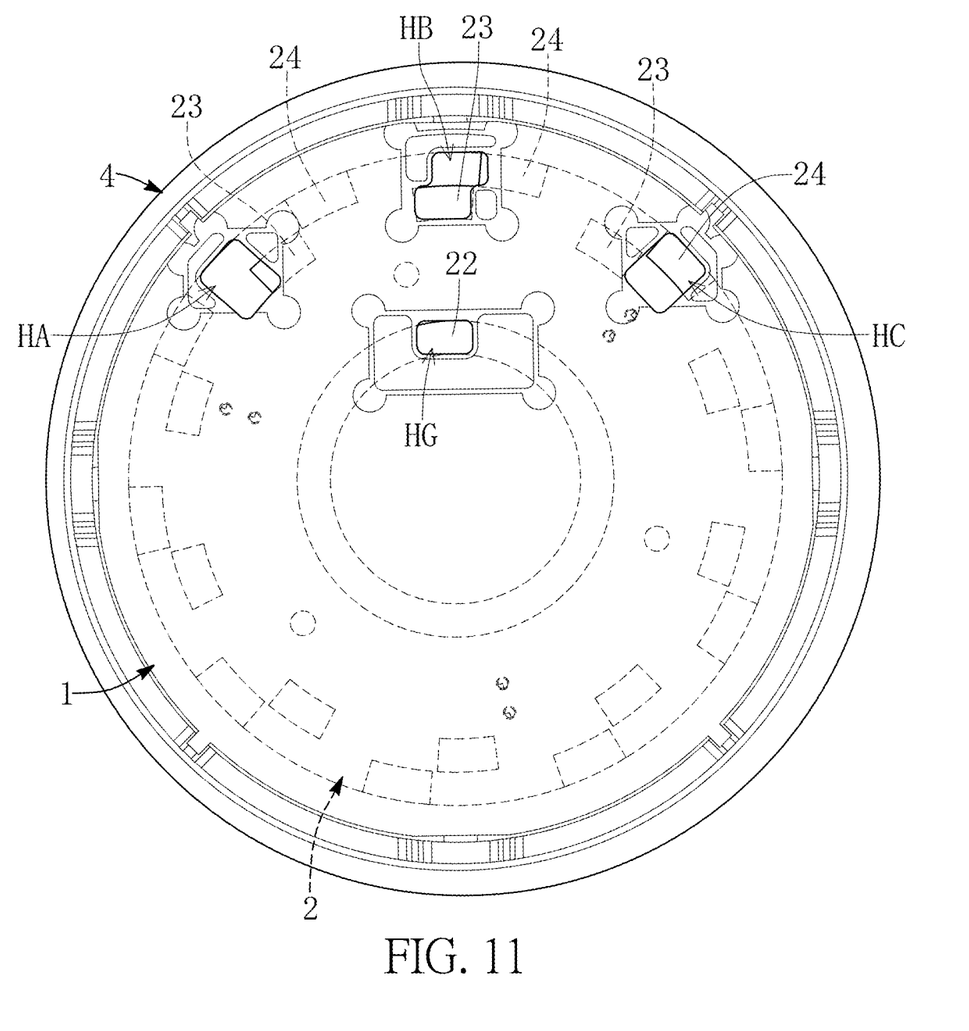
FIG. 11 is yet another schematic view of the seat rotating relative to the substrate according to the present disclosure.

In practice, since the interleaved arrangement of the inner pad 23 and the outside pad 24 in the radial direction D1 within each of the groups, the first opening HA, the second opening HB, and the third opening HC will each expose only at least one of the inner pad 23 and the outside pad 24 to be electrically coupled with the conductive spring piece 31, and the components exposed by the first opening HA, the second opening HB, and the third opening HC are completely different from one another. For example, when the seat 1 is at the 0-degree position as shown in FIG. 9, the seat 1 is rotated relative to the substrate 2 to the 45-degree position as shown in FIG. 10, and the seat 1 is rotated relative to the substrate 2 to the 90-degree position as shown in FIG. 11. Accordingly, the knob structure 100 at different angles can utilize the conductive spring pieces 31 to simultaneously and electrically couple with different conductive components, so as to generate different identification signals to determine the rotation angle of the knob structure 100.

Optionally, in order to increase the variety of signals that the knob structure 100 can provide, the knob structure 100 may also include a plurality of push switches 5. When each of the push switches 5 is pressed, each of the push switches is configured to electrically couple the inner pads 23 and the ring pad 22. As a result, the knob structure 100 can provide signals different from the first signal, the second signal, and the third signal through a combination of pressing and rotating actions.

For example, when one of the push switches 5 is pressed and the knob structure 100 is rotated, the outside pad, the inner pad, and the ring pad are simultaneously electrically coupled, so that the substrate 2 can send a fourth signal to the touch control display panel.

In the present embodiment, in one of the inner pads 23 and one of the outside pads 24 adjacent to each other, a sum of a width W23 of the inner pad 23 along a radial direction D1 and a width W24 of the outside pad 24 along the radial direction D1 is less than or equal to a shortest distance LS from any one of the inner pads 23 to the ring pad 22, so that a configuration region for installing a plurality of push switches 5 can be provided between the inner pads 23 and the ring pad 22.

Additionally, the knob structure 100 may optionally include a conductive compression spring 6, and the substrate 2 includes a central contact pad 25. One of two ends of the conductive compression spring 6 abuts against the central contact pad 25, and another one of the two ends of the conductive compression spring 6 abuts against a conductive film (not shown) on the inner side of the operating cover 4, so that the conductive film can receive the activation charge through the operating cover 4 and activate the central contact pad 25 via the conductive compression spring 6.

I It is worth noting that in practice, the operating cover 4 can be made of insulating material, and can achieve charge transfer through a thin design. For example, the operating cover 4 can be made of PET polyester plastic, and a thickness of the operating cover 4 can be designed to be less than 0.2 millimeters, allowing charges from a human body to pass through the thin operating cover 4 (e.g., when a finger touches the operating cover 4) and be transferred to the conductive film on the inner side of the operating cover 4. Thus, the central contact pad 25 can receive the charge through the conductive compression spring 6 to be activated. In other words, the knob structure 100 of the present disclosure can transmit signals to control the touch control display panel through a grabbing operation.

Naturally, each of the push switches 5 can also be electrically coupled to the conductive compression spring 6 according to practical requirements, so as to increase the total number of different signals that the knob structure 100 can provide to the touch control display panel.

Second Embodiment

Figure 7:
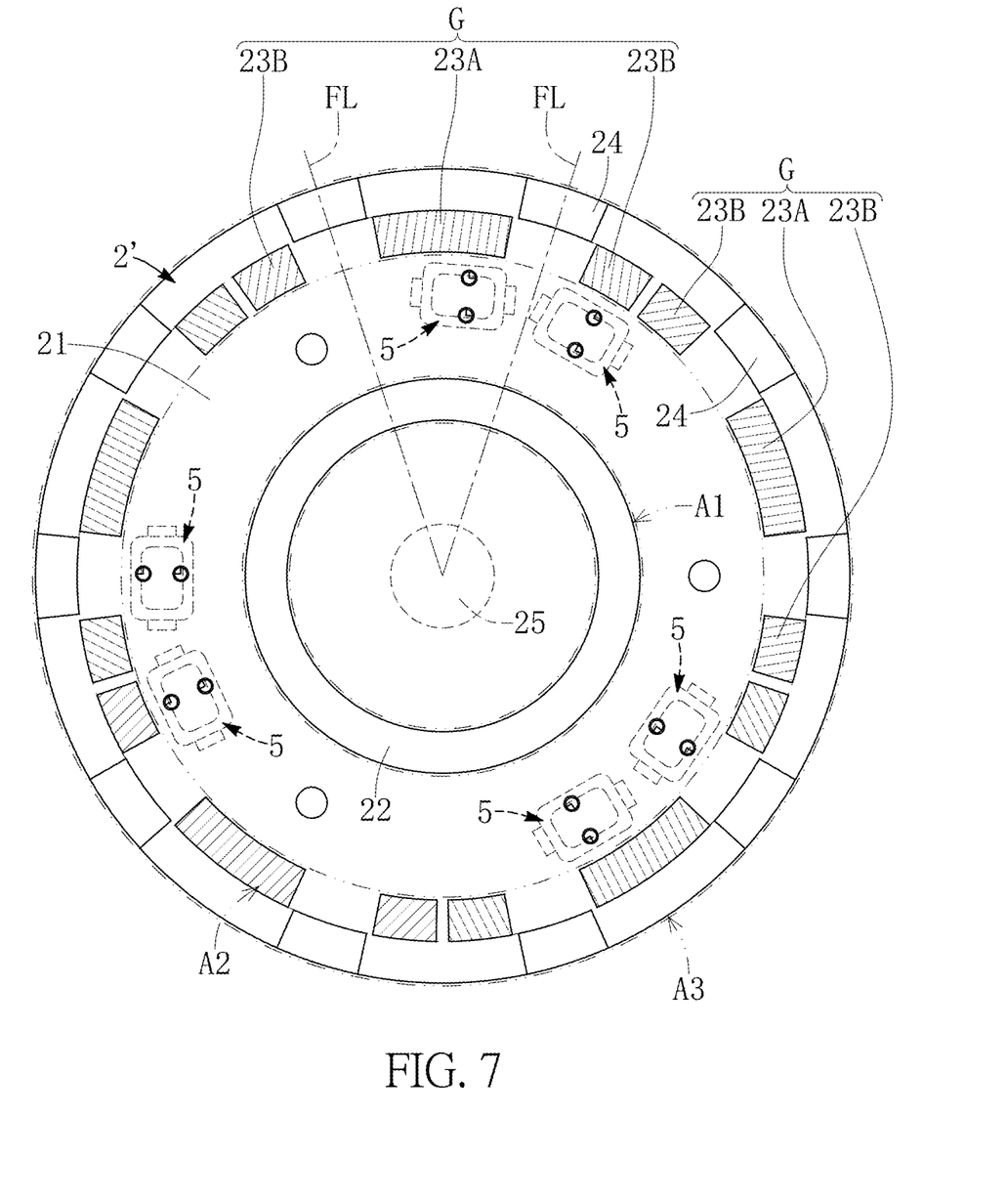
FIG. 7 is a schematic planar view of the substrate according to the present disclosure in another implementation.
Figure 8:
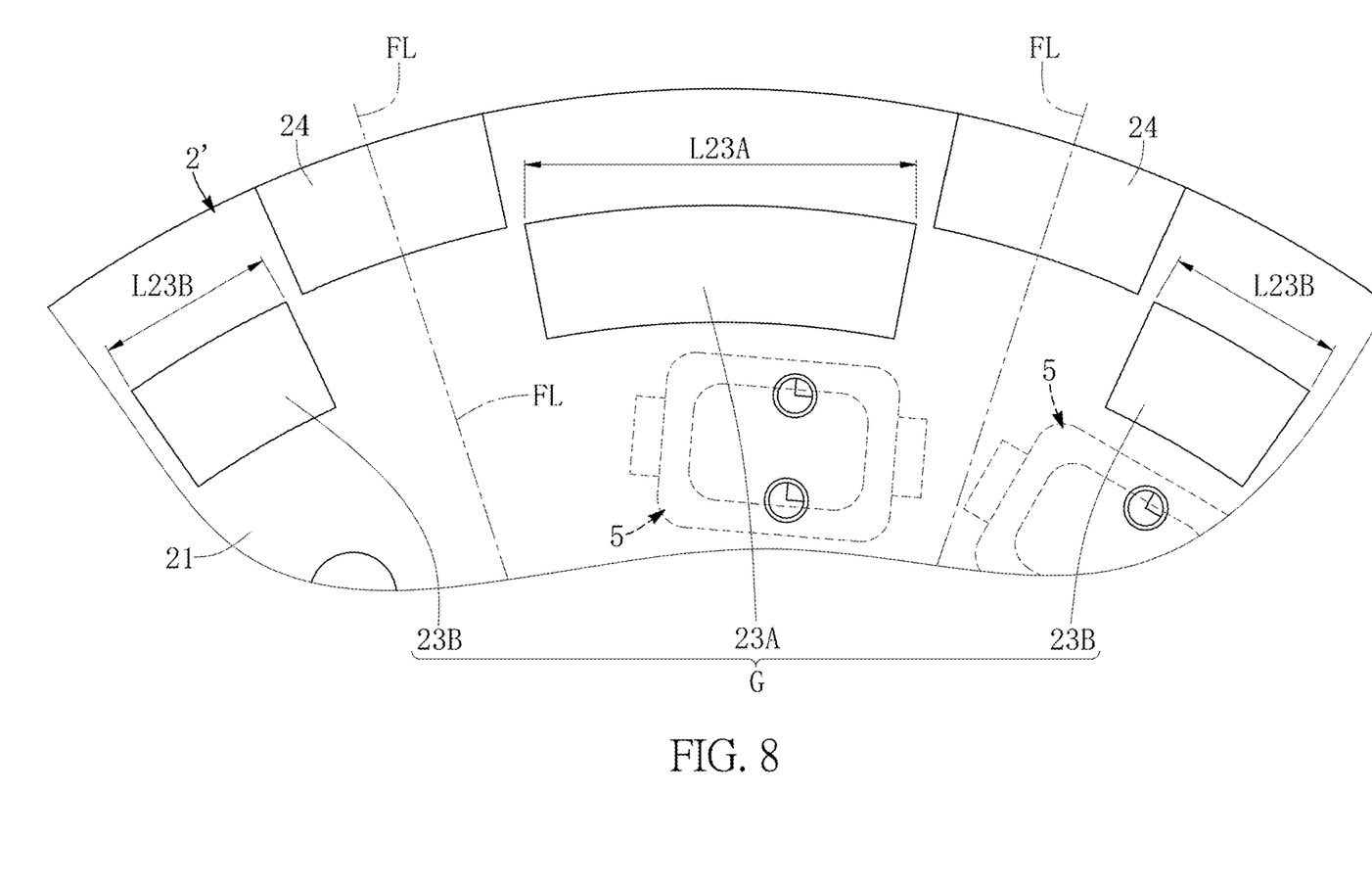
FIG. 8 is a schematic enlarged view of a section in FIG. 7.

Referring to FIG. 7 and FIG. 8, the present embodiment is similar to the first embodiment, and the similarities therebetween will not be repeated herein. The difference between the present embodiment and the first embodiment mainly resides in a substrate 2'.

The inner pads (i.e., 23A, 23B in FIG. 7 and FIG. 8) are divided into a plurality of groups to generate a plurality of circuits.

Specifically, the knob structure 100 includes a plurality of inner assemblies G (in the present embodiment, five are used as an example) disposed on the second ring configuration region A2. Each of the inner assemblies G includes a plurality of inner pads (i.e., 23A, 23B in FIG. 7 and FIG. 8) that are electrically coupled to each other and spaced apart from each. In other words, the inner pads 23A, 23B of the knob structure 100 form five circuits.

As a result, each of the circuits can generate three different signals in conjunction with the outside pads and the ring pad. Therefore, in the present embodiment, the knob structure can generate a total of fifteen signals.

For example, considering one of the circuits in conjunction with the outside pads 24 and the ring pad 22, when the ring pad 22 and any one of the outside pads 24 are electrically coupled by the trigger element, the substrate 2 can send the first signal to the touch control display panel. In contrast, when the ring pad 22 and one of the inner pads of any inner assembly G are electrically coupled by the trigger element 3, the substrate 2 can send a second signal or a third signal to the touch control display panel according to a position of one of the outside pads corresponding to the first signal.

It is worth noting that each of the inner assemblies G is passed through by two imaginary lines FL. More specifically, a quantity of the inner pads 23A, 23B in each of the inner assemblies is three, the three inner pads 23A, 23B are spaced apart from each other, and the two imaginary lines FL are located on both sides of the middle inner pad 23A. An outer arc length L23A of the middle inner pad 23A is greater than each of outer arc lengths L23B of another two of the three inner pads 23B.

Naturally, to increase the quantity of different signals, the knob structure 100 can also be combined with the push switches 5, so that each of the push switches 5 can electrically couple the ring pad 22 and the inner pads 23A, 23B of any one of the inner assemblies G when pressed.

Beneficial Effects of the Embodiments

In conclusion, in the knob structure provided by the present disclosure, by virtue of "the carrier having a first ring configuration region, a second ring configuration region, and a third ring configuration region that jointly define a center," "the inner pads being spaced apart from each other and being electrically coupled to each other, and the outside pads being spaced apart from each other and being electrically coupled to each other" and "the trigger element being configured to be operated to electrically couple the ring pad, and at least one of the inner pads and the outside pads," the knob structure can generate a first signal, a second signal, and a third signal to identify the current state of the knob structure (e.g., being pressed, rotated, or touched).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A knob structure configured to be installed on a touch control display panel, comprising:
   a seat;
   a substrate disposed on the seat, wherein the substrate includes:
      a carrier having a first ring configuration region, a second ring configuration region, and a third ring configuration region that jointly define a center;
      a ring pad disposed on the first ring configuration region;
      a plurality of inner pads disposed on the second ring configuration region, wherein the inner pads are spaced apart from each other and are electrically coupled to each other; and
      a plurality of outside pads disposed on the third ring configuration region, wherein the outside pads are spaced apart from each other and are electrically coupled to each other;
      wherein an imaginary line between any one of the outside pads and the center defines a first side and a second side, and wherein one of the inner pads is arranged on the first side, and the second side is configured to not have any one of the outside pads and the inner pads;
   a trigger element disposed on the substrate, wherein the trigger element is configured to be operated to electrically couple the ring pad, and at least one of the inner pads and the outside pads; wherein, when the ring pad and any one of the outside pads are electrically coupled by the trigger element, the substrate sends a first signal to the touch control display panel;
   wherein, when the ring pad and any one of the inner pads are electrically coupled by the trigger element, the substrate sends a second signal to the touch control display panel; and wherein, when the ring pad is individually and electrically coupled by the trigger element, the substrate sends a third signal to the touch control display panel; and
   an operating cover disposed on the seat, wherein the trigger element and the substrate are covered by the operating cover.

2. The knob structure according to claim 1, wherein the first ring configuration region is surrounded by the second ring configuration region, and the second ring configuration region is located between the first ring configuration region and the third ring configuration region.

3. The knob structure according to claim 1, wherein an outer arc length of each of the inner pads is within a range from 95% to 105% of an outer arc length of each of the outside pads.

4. The knob structure according to claim 1, wherein an outer arc length of each of the inner pads and an outer arc length of each of the outside pads are within a range from 3% to 5% of the circumference of the carrier.

5. The knob structure according to claim 1, wherein, in one of the inner pads and one of the outside pads adjacent to each other, a sum of a width of the inner pad along a radial direction and a width of the outside pad along the radial direction is less than or equal to a shortest distance from any one of the inner pads to the ring pad.

6. The knob structure according to claim 1, wherein the trigger element includes a plurality of conductive spring pieces disposed on the carrier; and wherein two contact ends of each of the conductive spring pieces correspond in position to the first ring configuration region, the second ring configuration region, and the third ring configuration region, and each of the conductive spring pieces is configured to be electrically coupled to the ring pad, the inner pads, and the outside pads.

7. The knob structure according to claim 6, wherein the seat has a first opening, a second opening, and a third opening corresponding in position to the second ring configuration region and the third ring configuration region, and a fourth opening that corresponds in position to the first ring configuration region; wherein the ring pad is exposed to an outside of the seat through the fourth opening, and a part of the outside pads and a part of the inner pads are exposed to an outside of the seat through the first opening, the second opening, and the third opening; wherein exposure conditions of the outside pads and the inner pads through the first opening, the second opening, and the third opening are distinct from each other; and wherein the conductive spring pieces pass through the first opening, the second opening, the third opening, and the fourth opening to electrically couple the ring pad, the inner pads, and the outside pads.

8. The knob structure according to claim 1, further comprising a plurality of push switches, wherein, when each of the push switches is pressed, each of the push switches is configured to electrically couple the inner pads and the ring pad.

9. A knob structure configured to be installed on a touch control display panel, comprising:
  a seat;
  a substrate disposed on the seat, wherein the substrate includes:
    a carrier having a first ring configuration region, a second ring configuration region, and a third ring configuration region that jointly define a center;
    a ring pad disposed on the first ring configuration region;
    a plurality of inner assemblies disposed on the second ring configuration region, each of the inner assemblies includes a plurality of inner pads, and the inner pads are spaced apart from each other and are electrically coupled to each other;
    a plurality of outside pads disposed on the third ring configuration region, wherein the outside pads are spaced apart from each other and are electrically coupled to each other;
    wherein an imaginary line is between any one of the outside pads and each of the inner assemblies is passed through by two imaginary lines;
  a trigger element disposed on the substrate, wherein the trigger element is configured to be operated to electrically couple the ring pad, and at least one of the inner pads and the outside pads, wherein, when the ring pad and any one of the outside pads are electrically coupled by the trigger element, the substrate sends a first signal to the touch control display panel; and wherein, when the ring pad and any one of the inner pads are electrically coupled by the trigger element, the substrate is configured to send a second signal or a third signal to the touch control display panel according to a position of one of the outside pads corresponding to the first signal; and
  an operating cover disposed on the seat, wherein the trigger element and the substrate are covered by the operating cover.

10. The knob structure according to claim 9, wherein the first ring configuration region is surrounded by the second ring configuration region, and the second ring configuration region is located between the first ring configuration region and the third ring configuration region.

11. The knob structure according to claim 9, wherein a quantity of the inner pads in each of the inner assemblies is three, the three inner pads are spaced apart from each other, and an outer arc length of one of the three inner pads located in the middle is greater than each of outer arc lengths of another two of the three inner pads.

12. The knob structure according to claim 9, wherein, in one of the inner pads and one of the outside pads adjacent to each other, a sum of a width of the inner pad along a radial direction and a width of the outside pad along the radial direction is less than or equal to a shortest distance from any one of the inner pads to the ring pad.

13. The knob structure according to claim 9, wherein the trigger element includes a plurality of conductive spring pieces disposed on the carrier; and wherein two contact ends of each of the conductive spring pieces correspond in position to the first ring configuration region, the second ring configuration region, and the third ring configuration region, and each of the conductive spring pieces is configured to be electrically coupled to the ring pad, the inner pads, and the outside pads.

14. The knob structure according to claim 13, wherein the seat has a first opening, a second opening, and a third opening corresponding in position to the second ring configuration region and the third ring configuration region, and a fourth opening that corresponds in position to the first ring configuration region; wherein the ring pad is exposed to an outside of the seat through the fourth opening, and a part of the outside pads and a part of the inner pads are exposed to an outside of the seat through the first opening, the second opening, and the third opening; wherein exposure conditions of the outside pads and the inner pads through the first opening, the second opening, and the third opening are distinct from each other; and wherein the conductive spring pieces pass through the first opening, the second opening, the third opening, and the fourth opening to electrically couple the ring pad, the inner pads, and the outside pads.

15. The knob structure according to claim 9, further comprising a plurality of push switches, wherein, when each of the push switches is pressed, each of the push switches is configured to electrically couple the ring pad and the inner pads of any one of the inner assemblies.

\* \* \* \* \*